United States Patent [19]

Ewbank et al.

[11] Patent Number: 5,170,268
[45] Date of Patent: Dec. 8, 1992

[54] POLARIZATION-INDEPENDENT ENERGY EXCHANGE AND PHASE CONJUGATION

[75] Inventors: Mark D. Ewbank, Newbury Park; Rene A. Vazquez, Thousand Oaks, both of Calif.

[73] Assignee: Rockwell International Corporation, Seal Beach, Calif.

[21] Appl. No.: 787,501

[22] Filed: Nov. 4, 1991

[51] Int. Cl.$^5$ ............................ G02F 1/35; H01S 3/10
[52] U.S. Cl. ........................................ 359/7; 359/300; 359/338
[58] Field of Search ............................ 359/7, 300, 338

[56] References Cited

U.S. PATENT DOCUMENTS

| | | | |
|---|---|---|---|
| 4,767,195 | 8/1988 | Pepper | 359/300 |
| 4,880,295 | 11/1989 | Rockwell et al. | 359/300 |
| 4,991,177 | 2/1991 | Chang et al. | 359/300 |
| 5,038,359 | 8/1991 | Pepper et al. | 359/300 |
| 5,130,849 | 7/1992 | Valley et al. | 359/300 |

OTHER PUBLICATIONS

Chang, et al., Optical Phase Conjugation by Backscattering in Barium Titanate, Optics Letters, vol. 10, p. 408 (1985).
Ewbank, Photorefractive Properties of Strontium-Barium Niobate, et al., Journal of Applied Physics, vol. 62, p. 374 (1987).
Huignard, et al., Coherent Signal Beam Amplification in Two-Wave Mixing Experiments with Photorefractive BSO Crystals, Optics Communication, vol. 38, p. 249 (1981).
Ja, Energy Transfer between Two Beams in Writing a Reflection Volume Hologram in a Dynamic Medium, Optical and Quantum Electronics, vol. 14, p. 547 (1982).
MacDonald, et al, Asymmetric Transmission through a Photorefractive Crystal of Barium Titanate, Optics Communication, vol. 50, p. 146 (1984).
Mamaev, et al., Discrimination Mechanisms for Wavefront Inversion in Induced Diffusional Backscattering in Photorefractive Crystals, Seriya Fizicheskaya, vol. 54, p. 1036 (1990).

(List continued on next page.)

Primary Examiner—Martin Lerner
Attorney, Agent, or Firm—John J. Deinken

[57] ABSTRACT

A polarization independent energy exchanger transfers optical energy from a first coherent beam of optical energy to a second coherent beam of optical energy where the second beam is coherent with respect to the first beam, the second beam is counterpropagating with respect to the first beam, and the second beam possesses substantially the same polarization as the first beam. The energy exchanger includes a nonlinear optical uniaxial crystal having electro-optic coefficients $r_{13}$ and $r_{23}$ of equal magnitude and having a sufficiently large photorefractive charge density to achieve efficient contradirectional two-beam coupling, independent of the polarization states of the first and second beams. The crystal is oriented to receive the first and second beams therein such that the optic axis of the crystal is aligned parallel to the propagation directions of the first and second beams. The invention also envisions a polarization-independent backscattering phase conjugator for transferring optical energy from a first coherent beam of optical energy to a second coherent beam of optical energy where the second beam is the counterpropagating phase-conjugate reflection of the first beam. In this embodiment, a nonlinear optical uniaxial is provided with electro-optic coefficients $r_{13}$ and $r_{23}$ of equal magnitude and having a sufficiently large photorefractive charge density to achieve efficient phase-conjugate backscattering, independent of the polarization state of the first beam.

16 Claims, 4 Drawing Sheets

OTHER PUBLICATIONS

Mamaev, et al., Self— and Double-Conjugation by Stimulated Backscattering in Photorefractive Crystals, Conference on Laser and Electro-Optics Technical Digest, vol. 7, p. 72, Paper CTuD2 (1990).

Mullen, et al, Stimulated Photorefractive Scattering Phase Conjugators Retroreflector Arrays, Conference on Laser and Electro-Optics Technical Digest, vol. 7, p. 73, Paper CTuD3 (1990).

Vazquez, et al., Large Photorefractive Coupling Coefficient in a Thin Cerium-Doped Strontium-Barium Niobate Crystal, Journal of the Optical Society of America B, vol. 8, p. 1932 (1991).

Vazquez, et al., Photorefractive Properties of SBN:60 Systematically Doped with Rhodium, submitted to Journal of the Optical Society of America (Nov. 1991).

Vazquez, et al., Systematic Study of the Effects of Rhodium Doping on the Photorefractive Properties of Strontium-Barium Niobate, Optical Society of America Technical Digest, vol. 15, p. 252, Paper FS6 (1990).

Yeh, Contra-Directional Two-Wave Mixing in Photorefractive Media, Optics Communication, vol. 45, p. 323 (1983).

POLARIZATION-INDEPENDENT ENERGY EXCHANGE AND PHASE CONJUGATION

GOVERNMENT RIGHTS

This invention was made with United States Government support under Contract No. F33615-86-C-5003 awarded by the United States Air Force. The United States Government has certain rights in this invention.

BACKGROUND OF THE INVENTION

This invention, which concerns the field of nonlinear optics, addresses two nonlinear optical phenomena: (1) the exchange of energy between two mutually coherent beams of light, and (2) the phase-conjugate backscattering of a single coherent beam of light.

On a fundamental level, nonlinear optics is the study of the interaction of light with matter. This interaction is nonlinear because incident light can change the index of refraction in some materials, thereby affecting the frequency, intensity, and/or the phase of the light itself. By providing a means to manipulate these properties of a laser beam, nonlinear optics has yielded new optical applications, including optical information processing, optical computing, optical filtering, laser beam control, and novel optical sensor designs.

Photorefractive two-beam coupling is an area of nonlinear optics that deals with the transfer of energy from one beam of light (known as the pump beam) to another beam of light (denoted the probe beam). This transfer of energy occurs with no phase crosstalk between the pump beam that is "donating" energy and the probe beam that is "accepting" energy.

The photorefractive effect is a nonlinear optical phenomena which occurs in photorefractive crystals, such as barium titanate ($BaTiO_3$) and strontium barium niobate (SBN), and can be used to achieve two-beam coupling. Two mutually coherent laser beams illuminating a photorefractive crystal will cause an interference fringe pattern of light intensity to form within the crystal. This fringe pattern causes a charge separation, which creates an electric field that, in turn, induces a change in the index of refraction via the Pockels effect. The resulting volume refractive index grating (or real-time hologram) affects the propagation of the light beams in the crystal and allows the exchange of energy between the beams. This energy exchange by means of two-beam coupling lacks any phase crosstalk, i.e., one beam is amplified at the expense of the other, yet the spatial aberrations and frequency differences of the donor beam are not transferred to the acceptor beam. The discovery of this phenomena has led to a variety of new applications, including beam processing techniques, such as image amplification, laser beam cleanup, and beam combining, as well as device structures such as ring oscillators, laser radars, and sensor protection devices.

Photorefractive phase conjugation is an area of nonlinear optics that deals with the generation of a phase-conjugated beam of light. If a light beam is considered as the motion of a family of wave fronts in space, the phase-conjugate of that light beam has exactly the same set of wavefronts as the initial beam, but propagates in the opposite direction. This phase-conjugate beam is considered a time-reversed replica of the incident beam since it exactly retraces the path of the incident beam.

Typically, photorefractive two-beam coupling and photorefractive phase-conjugation require that the polarization of each incident beam be aligned in a specific direction with respect to the crystal to take advantage of the appropriate electro-optic coefficient. For example, in photorefractive barium titanate, it is common knowledge that the efficiency of two-beam coupling is maximized when the largest electro-optic coefficient $r_{42}$ is employed which, in turn, dictates the extraordinary polarization requirements. Similarly, in photorefractive strontium-barium niobate, the electro-optic coefficient $r_{33}$ is the largest and again extraordinary polarization is most commonly used. Restricting the incident polarizations to single polarization states can be accomplished with simple polarizing beam splitters by discarding the undesired polarization components of the incident beam; however, any nonlinear optical device based on such a scheme would be rendered ineffective for the wrong incident polarizations. Considerable advantage would be gained by devising a method of two-beam coupling which does not have such polarization requirements.

Competition from a phenomena called beam fanning imposes another limitation associated with photorefractive two-beam coupling and photorefractive phase conjugation. As a laser beam propagates through a photorefractive crystal, it scatters due to imperfections and impurities inside the crystal. The scattered beams interfere with the main beam and write their own photorefractive gratings, resulting in the scattered beams being amplified at the expense of the main beam. In two-beam coupling, this "noise" amplification consumes energy from the pump beam that would otherwise have been used for the amplification of the probe beam. In addition, these extra fanning gratings usually compete with the two-beam-coupling grating for the finite number of photorefractive charges which are available within the crystal, resulting in decreased two-beam-coupling efficiency. Similarly for photorefractive phase conjugation, these fanning gratings can compete with the phase-conjugate gratings, decreasing the phase-conjugate reflectivity. For these reasons, it would be desirable to be able to suppress this beam fanning phenomena while still maintaining efficient two-beam coupling or phase conjugation.

SUMMARY OF THE INVENTION

A polarization independent energy exchanger transfers optical energy from a first coherent beam of optical energy to a second coherent beam of optical energy where the second beam is coherent with respect to the first beam, the second beam is counterpropagating with respect to the first beam, and the second beam possesses substantially the same polarization as the first beam. The energy exchanger includes a nonlinear optical uniaxial crystal having electro-optic coefficients $r_{13}$ and $r_{23}$ of equal magnitude and having a sufficiently large photorefractive charge density to achieve efficient contradirectional two-beam coupling, independent of the polarization states of the first and second beams. The crystal is oriented to receive the first and second beams therein such that the optic axis of the crystal is aligned parallel to the propagation directions of the first and second beams.

In a more particular embodiment the crystal has a sufficient photorefractive charge density and a sufficiently large $r_{13}$ electro-optic coefficient that the coupling coefficient at the grating spacing for contradirectional coupling is sufficiently large for contradirectional coupling to predominate in the crystal over codirectional coupling.

In another embodiment, the energy exchanger may further include a means for reflecting, the second beam being generated by reflection of the first beam from the reflecting means. More particularly, the reflecting means may be a back surface air-crystal interface of the photorefractive material.

The invention also envisions a polarization-independent backscattering phase conjugator for transferring optical energy from a first coherent beam of optical energy to a second coherent beam of optical energy where the second beam is the counterpropagating phase-conjugate reflection of the first beam. In this embodiment, a nonlinear optical uniaxial crystal is provided with electro-optic coefficients $r_{13}$ and $r_{23}$ of equal magnitude and having a sufficiently large photorefractive charge density to achieve efficient phase-conjugate backscattering, independent of the polarization state of the first beam. The crystal is oriented to receive the first beam such that the optic axis of the crystal is aligned parallel to the propagation direction of the first beam.

In a more particular embodiment the crystal has a sufficient photorefractive charge density and a sufficiently large $r_{13}$ electro-optic coefficient that the coupling coefficient for backscattering phase conjugation at the corresponding grating spacing is sufficiently large for the phase-conjugate contradirectional coupling to predominate over codirectional coupling.

In another more detailed embodiment the phase conjugator further includes a means for reflecting, the second beam being seeded by reflection of the first beam from the reflecting means. The reflecting means may be provided by a retroreflective array.

DESCRIPTION OF THE INVENTION

This invention employs a unique contradirectional wave-mixing configuration in uniaxial crystals to accomplish photorefractive two-beam coupling or photorefractive phase conjugation. This unique configuration circumvents two limitations which are normally encountered in photorefractive nonlinear optics: (1) polarization dependence and (2) competition from beam fanning.

Codirectional two-beam coupling, where two coherent light beams are typically incident upon the same face of a photorefractive crystal and cross at an acute angle within the photorefractive crystal, has been extensively investigated {see, e.g., Huignard, et al., Coherent Signal Beam Amplification in Two-Wave Mixing Experiments with Photorefractive BSO Crystals, Optics Communication, Volume 38, Page 249 (1981); Ewbank, Photorefractive Properties of Strontium-Barium Niobate, et al., Journal of Applied Physics, Volume 62, Page 374 (1987)}. Contradirectional two-beam coupling has also previously been explored, both theoretically (Ja, Energy Transfer between Two Beams in Writing a Reflection Volume Hologram in a Dynamic Medium, Optical and Quantum Electronics, Volume 14, Page 547 (1982); Yeh, Contra-Directional Two-Wave Mixing in Photorefractive Media, Optics Communication, Volume 45, Page 323 (1983)) and experimentally (MacDonald, et al., Asymmetric Transmission through a Photorefractive Crystal of Barium Titanate, Optics Communication, Volume 50, Page 146 (1984)), but not nearly to the same extent as codirectional two-beam coupling.

Figure 1:
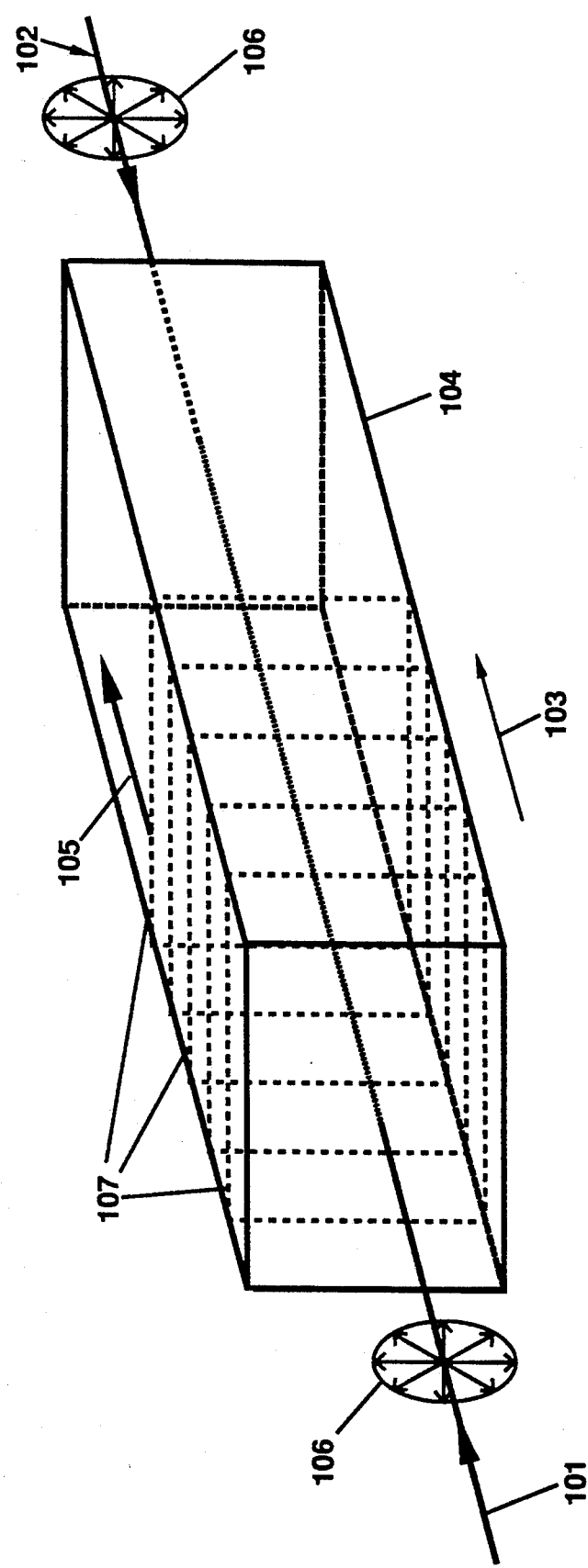
FIG. 1 is a perspective schematic view illustrating polarization-independent contradirectional two-beam-coupling in a photorefractive crystal with suppressed beam fanning.

FIG. 1 illustrates an embodiment of this invention configured for photorefractive contradirectional two-beam coupling. In this arrangement, two coherent light beams 101 and 102 counterpropagate along the c-axis (optic axis) 103 of a uniaxial crystal 104, which means that the contradirectional grating wavevector 105 (for the gratings created within the crystal-depicted by the dashed lines 107) is also oriented the c-axis 103. For this geometry, light beams with any polarization orientation, as indicated by the multidirectional arrows 106, propagate as ordinary waves inside the crystal 104, since the propagation direction is along the c-axis 103, implying that the polarization vectors 106 for the light waves 101 and 102 (regardless of their orientation) remain perpendicular to the optic axis 103 of the uniaxial photorefractive crystal 104. When the space-charge electric field is aligned along the c-axis 103 of this uniaxial (i.e., trigonal, hexagonal, or tetragonal (except point group 4) crystal symmetries) crystal 104, the $r_{13}=r_{23}$ and $r_{33}$ electro-optic coefficients are invoked for ordinary and extraordinary polarizations, respectively. In other words, for the geometry of FIG. 1, with the grating wavevector 105 directed along the <001> direction and with ordinary polarization, only the $r_{13}=r_{23}$ component of the electro-optic tensor is utilized and, moreover, is utilized to its fullest extent. This constitutes the basis for the polarization independence of the two-beam coupling process schematically illustrated in FIG. 1. the pair of incident lights beams 101 and 102, propagating parallel to the optic axis 103, can have any polarization orientation 106; the only requirement is that both beams 101 and 102 have a substantial component of the same polarization so that an interference pattern will be formed in the crystal 104.

Figure 2:
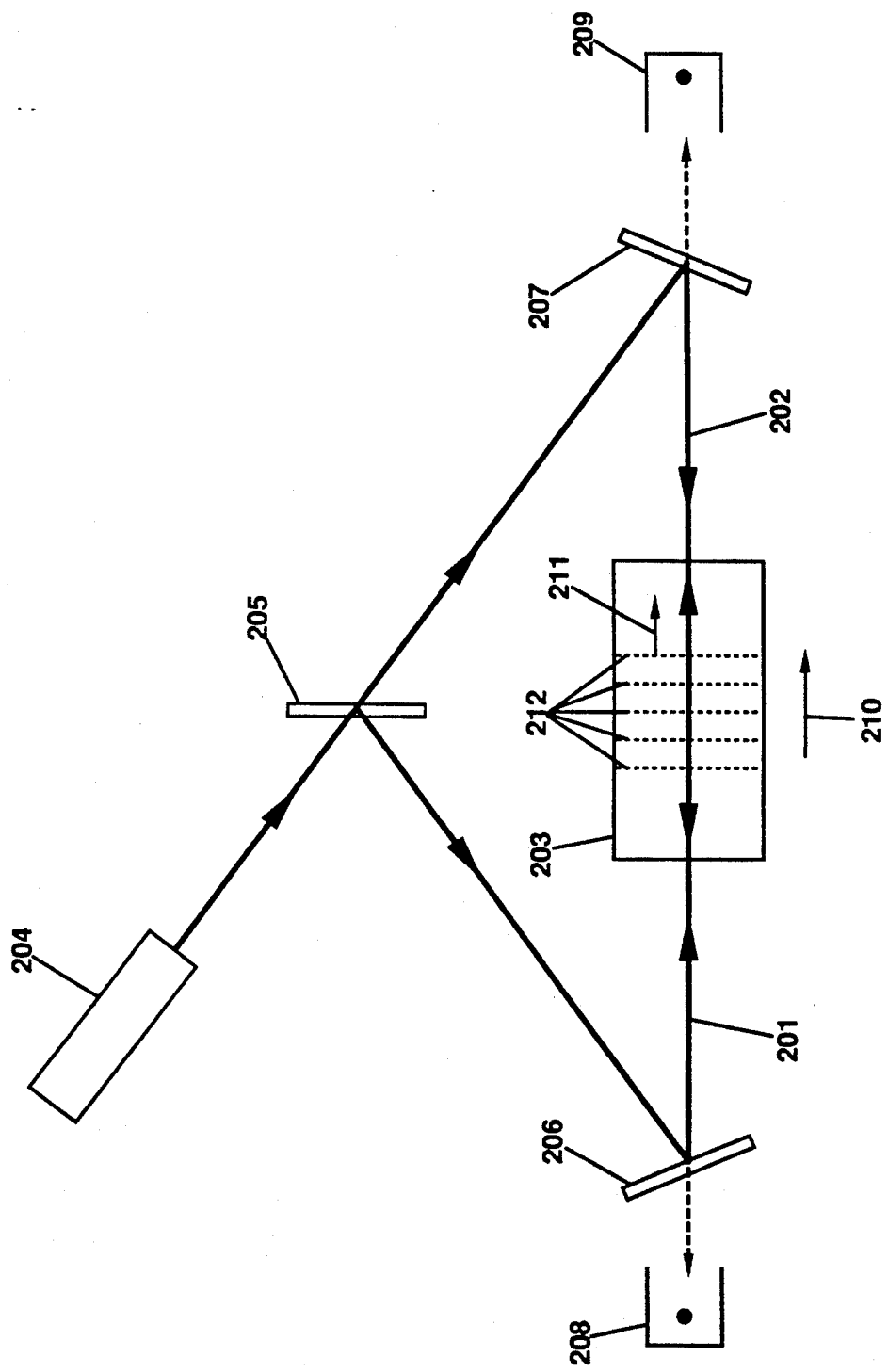
FIG. 2 is a schematic diagram depicting a full optical setup for polarization-independent contradirectional two-beam-coupling in a photorefractive crystal.

FIG. 2 schematically illustrates an example of a full optical setup for the generation of two coherent counterpropagating laser beams 201 and 202 directed to interact in a photorefractive crystal 203 via contradirectional two-beam coupling. The two coherent laser beams 201 and 202 are generated by a laser 204 and are split into two separate beams by a beamsplitter 205. Two other beamsplitters 206 and 207 steer the respective laser beams into the photorefractive crystal 203 and divert to be sampled, at the two detectors 208 and 209, portions of the two beams transmitted through the photorefractive crystal (after the two-beam-coupling interaction). As in the embodiment illustrated in FIG. 1, the light beams 201 and 202 propagate parallel to the optic axis 210 (i.e., c-axis) of the uniaxial crystal 203, producing a grating (represented by the dashed lines 212) whose wavevector 211 is also oriented parallel to the optic axis 210.

Use of the configurations shown in FIGS. 1 or 2 will also reduce beam fanning. Photorefractive beam fanning (Vazquez, et al., Large Photorefractive Coupling Coefficient in a Thin Cerium-Doped Strontium-Barium Niobate Crystal, Journal of the Optical Society of America B, Volume 8, Page 1932 (1991)) arises from two-beam-coupling amplification of laser light scattered from imperfections and impurities in the crystal. Scattered light from the crystal 104, for example, will interfere with the main beams 101 and 102 and write codirectional photorefractive fanning gratings, which in turn amplify the scattered beams at the expense of the main beams. Typically, forward scattering is predominant and the codirectional fanning gratings generally win the competition with the contradirectional two-beam coupling gratings for the finite number of photorefractive charges, since codirectional gratings are usually more efficient. However, the configuration shown in FIG. 1 suppresses the efficiency of these codirectional gratings; the contradirectional gratings on the other hand maintain reasonably high efficiency. This suppression of fanning can be explained as follows. The forward scattering responsible for beam fanning generates grating wavevectors oriented nearly perpendicular to the c-axis 103, i.e., with small angular deviations $\delta$ from the $<100>$ or $<010>$ directions. With the incident beam propagating along the c-axis 103 of a uniaxial crystal 104 as an ordinary wave, the efficiency of these fanning gratings is proportional to ($r_{13} \sin \delta \cos 2\delta + r_{42} \cos \delta \sin 2\delta$), which is a negligible quantity, as compared to $r_{13}$, when $\delta$ is small. Hence, the configurations in FIGS. 1 and 2 favor the formation of contradirectional two-beam-coupling gratings and suppress codirectional fanning gratings.

Figure 3:
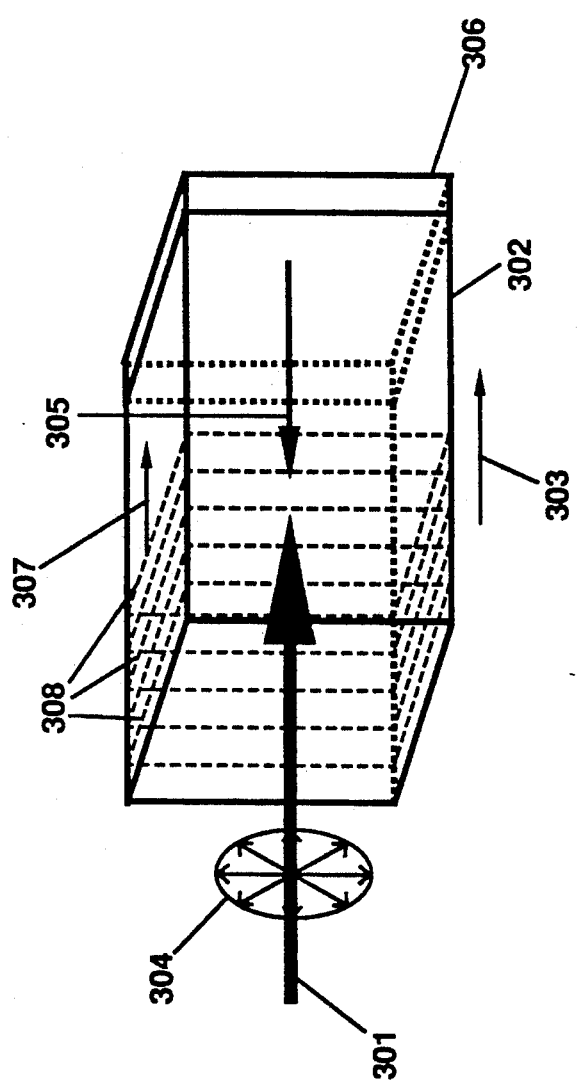
FIG. 3 is a perspective schematic view of a polarization-independent backscattering phase conjugator implemented in a photorefractive crystal with suppressed beam fanning.

The unique features (i.e., polarization independence and suppressed beam fanning) obtained with the contradirectional two-beam-coupling configuration, described above with respect to FIGS. 1 and 2, can also benefit a specific phase conjugation technique based on backscattering. Stimulated backscattering phase conjugation in photorefractive crystals has been previously studied (Chang, et al., Optical Phase Conjugation by Backscattering in Barium Titanate, Optics Letters, Volume 10, Page 408 (1985); Mamaev, et al., Self- and Double-Conjugation by Stimulated Backscattering in Photorefractive Crystals, Conference on Laser and Electro-Optics Technical Digest, Volume 7, Page 72, Paper CTuD2 (1990); Mullen, et al, Stimulated Photorefractive Scattering Phase Conjugators Backseeded with Retroreflector Arrays, Conference on Laser and Electro-Optics Technical Digest, Volume 7, Page 73, Paper CTuD3 (1990); Mamaev, et al., Discrimination Mechanisms for Wavefront Inversion in Induced Diffusional Backscattering in Photorefractive Crystals, Seriya Fizicheskaya, Volume 54, Page 1036 (1990)), but the techniques utilized in these studies require a specific polarization state (extraordinary in all cases). As suggested by the configuration for a backscattering phase conjugator depicted in FIG. 3, if a laser beam 301 is incident on a uniaxial photorefractive crystal 302, propagating parallel to the optic axis (i.e., c-axis) 303, then that beam is polarized purely ordinary (regardless of the orientation of its polarization vector) since any polarization orientation 304 is perpendicular to the optic axis 303. The counterpropagating phase-conjugate beam 305, seeded either intrinsically by backscattering from crystal defects or intentionally by a retroreflecting array 306, such as an array of micro corner cubes, writes a grating 308 whose wavevector 307 is also parallel to the optic axis 303. As in the contradirectional two-beam-coupling configuration shown in FIGS. 1 and 2, the backscattering phase conjugator illustrated in FIG. 3 invokes only the $r_{13} = r_{23}$ electro-optic coefficients, is independent of incident polarization, and suppresses beam fanning from codirectional scattering.

One potential problem for accomplishing efficient contradirectional two-beam coupling or phase-conjugate backscattering has recently been resolved. In contradirectional two-beam coupling or phase-conjugate backscattering, the grating spacing is the optical wavelength divided by twice the refractive index. Such a small grating spacing requires a rather large photorefractive charge density to write an efficient hologram. In order to achieve this, the photorefractive charge density needs to be substantially increased by intentionally heavily doping the photorefractive crystals with impurities during growth. For example, recent work (Vazquez, et al., Photorefractive Properties of SBN:60 Systematically Doped with Rhodium, submitted to Journal of the Optical Society of America (November 1991); Vazquez, et al., Systematic Study of the Effects of Rhodium Doping on the Photorefractive Properties of Strontium-Barium Niobate, Optical Society of America Technical Digest, Volume 15, Page 252, Paper FS6 (1990)) in rhodium-doped strontium-barium niobate revealed an increase in the contradirectional two-beam coupling coefficient from less than 1 cm$^{-1}$ to almost 14 cm$^{-1}$, corresponding to an increase in photorefractive charge density from $\sim 3 \times 10^{16}$ cm$^{-3}$ to $\sim 5 \times 10^{17}$ cm$^{-3}$, when the doping concentration was increased from less than $5 \times 10^{18}$ cm$^{-3}$ to more than $6 \times 10^{19}$ cm$^{-3}$. A two-beam-coupling coefficient of $\sim 14$ cm$^{-1}$ means an optical amplification of over $10^6$ is possible in less than 1 cm length of photorefractive crystal.

Figure 4:
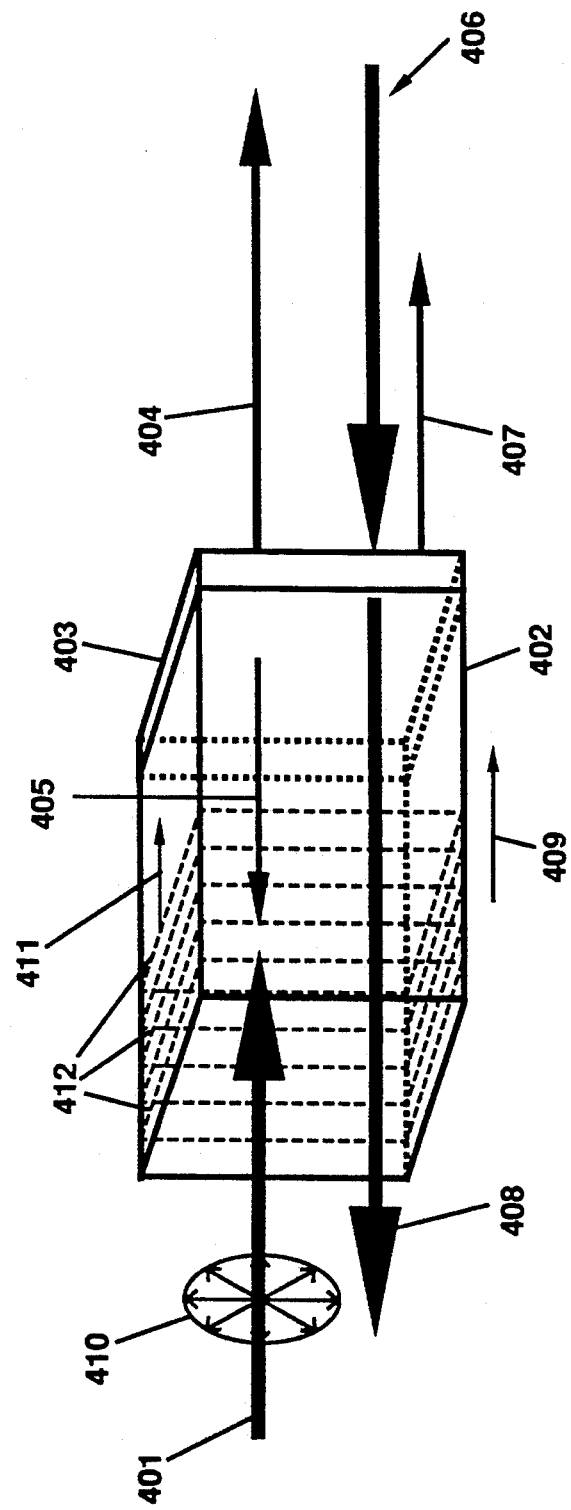
FIG. 4 is a perspective schematic view illustrating polarization-independent one-way glass using a photorefractive crystal with suppressed beam fanning.

The larger contradirectional two-beam-coupling coefficients observed in photorefractive crystals such as rhodium-doped strontium-barium niobate will also improve the performance of another application, that of one-way glass (MacDonald, et al., Asymmetric Transmission through a Photorefractive Crystal of Barium Titanate, Optics Communication, Volume 50, Page 146 (1984)). One-way glass is schematically illustrated in FIG. 4, where a single laser beam 401 is incident upon a photorefractive crystal 402 from the left with a partial reflector 403 attached to the right face of the crystal 402. This partial reflector splits the left-to-right transmitted beam 404 and the counterpropagating light beam 405 used for contradirectional two-beam coupling. For a single laser beam 406 incident upon the photorefractive crystal 402 from the right, the counterpropagating beam 407 generated at the partial reflector on the right face of the crystal 402 does not overlap the right-to-left incident beam 406 inside the crystal 402 and, consequently, the right-to-left transmitted beam 408 does not undergo any contradirectional two-beam coupling. As before, when the incident and reflected beams 401, 405, and 406 propagate parallel to the c-axis 409, they are purely ordinary polarization (regardless of the orientation of their polarization vectors 410). Also as before, the counterpropagating beams 401 and 405 write a grating 412 whose wavevector 411 is parallel to the c-axis 409. For a contradirectional two-beam-coupling coefficient of 14 cm$^{-1}$, the ratio of the two transmitted beams 404 and 408 is $\sim 1:500$ for a 1 cm interaction length in the photorefractive crystal 402 and a back-reflector reflectivity of 0.2, neglecting absorption. The larger contradirectional coupling coefficient improves the efficiency of the one-way glass, while the configuration in FIG. 4 (which invokes only the $r_{13}=r_{23}$ electro-optic coefficients) suppresses beam fanning arising from codirectional scattering and makes the one-way glass independent of incident polarization.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Chang, et al., Optical Phase Conjugation by Backscattering in Barium Titanate, Optics Letters, Volume 10, Page 408 (1985);

Ewbank, Photorefractive Properties of Strontium-Barium Niobate, et al., Journal of Applied Physics, Volume 62, Page 374 (1987);

Huignard, et al., Coherent Signal Beam Amplification in Two-Wave Mixing Experiments with Photorefractive BSO Crystals, Optics Communication, Volume 38, Page 249 (1981);

Ja, Energy Transfer between Two Beams in Writing a Reflection Volume Hologram in a Dynamic Medium, Optical and Quantum Electronics, Volume 14, Page 547 (1982);

MacDonald, et al., Asymmetric Transmission through a Photorefractive Crystal of Barium Titanate, Optics Communication, Volume 50, Page 146 (1984);

Mamaev, et al., Discrimination Mechanisms for Wavefront Inversion in Induced Diffusional Backscattering in Photorefractive Crystals, Seriya Fizicheskaya, Volume 54, Page 1036 (1990);

Mamaev, et al., Self- and Double-Conjugation by Stimulated Backscattering in Photorefractive Crystals, Conference on Laser and Electro-Optics Technical Digest, Volume 7, Page 72, Paper CTuD2 (1990);

Mullen, et al, Stimulated Photorefractive Scattering Phase Conjugators Backseeded with Retroreflector Arrays, Conference on Laser and Electro-Optics Technical Digest, Volume 7, Page 73, Paper CTuD3 (1990);

Vazquez, et al., Large Photorefractive Coupling Coefficient in a Thin Cerium-Doped Strontium-Barium Niobate Crystal, Journal of the Optical Society of America B, Volume 8, Page 1932 (1991);

Vazquez, et al., Photorefractive Properties of SBN:60 Systematically Doped with Rhodium, submitted to Journal of the Optical Society of America (Nov. 1991);

Vazquez, et al., Systematic Study of the Effects of Rhodium Doping on the Photorefractive Properties of Strontium-Barium Niobate, Optical Society of America Technical Digest, Volume 15, Page 252, Paper FS6 (1990);

Yeh, Contra-Directional Two-Wave Mixing in Photorefractive Media, Optics Communication, Volume 45, Page 323 (1983).

We claim:

1. A polarization independent energy exchanger for transferring optical energy from a first coherent beam of optical energy having a random polarization orientation to a second coherent beam of optical energy where the second beam is coherent with respect to the first beam, the second beam is counterpropagating with respect to the first beam, and the second beam possesses substantially the same polarization as the first beam, comprising:

a nonlinear optical uniaxial crystal having electro-optic coefficients $r_{13}$ and $r_{23}$ of equal magnitude and having a sufficiently large photorefractive charge density to achieve efficient contradirectional two-beam coupling, independent of the polarization states of the first and second beams, the crystal being oriented to receive the first and second beams therein such that the optic axis of the crystal is aligned parallel to the propagation directions of the first and second beams and such that the polarization orientation of the first and second beams is in a random direction within a plane perpendicular to the optic axis of the crystal.

2. The polarization independent energy exchanger of claim 1, wherein the crystal has a sufficient photorefractive charge density and a sufficiently large $r_{13}$ electro-optic coefficient that the coupling coefficient at the grating spacing for contradirectional coupling is sufficiently large for contradirectional coupling to predominate in the crystal over codirectional coupling.

3. The polarization independent energy exchanger of claim 1, further comprising a means for reflecting, the second beam being generated by reflection of the first beam from the reflecting means.

4. The polarization independent energy exchanger of claim 3, wherein the reflecting means further comprises a back surface air-crystal interface of the photorefractive material.

5. A method for transferring optical energy from a first coherent beam of optical energy having a random polarization orientation to a second coherent beam of optical energy where the second beam is coherent with respect to the first beam, the second beam is counterpropagating with respect to the first beam, and the second beam possesses substantially the same polarization as the first beam, comprising the steps of:

providing a nonlinear optical uniaxial crystal having electro-optic coefficients $r_{13}$ and $r_{23}$ which are equal and having a sufficiently large photorefractive charge density to achieve efficient contradirectional two-beam coupling, independent of the polarization states of the first and second beams, and orienting the crystal to receive the first and second beams therein such that the optic axis of the crystal is aligned parallel to the propagation directions of the first and second beams and such that the polarization orientation of the first and second beams is in a random direction within a plane perpendicular to the optic axis of the crystal.

6. The energy transfer method of claim 5, wherein the crystal is selected to have a sufficient photorefractive charge density and a sufficiently large $r_{13}$ electro-optic coefficient that the coupling coefficient at the grating spacing for contradirectional coupling is sufficiently large for contradirectional coupling to predominate in the crystal over codirectional coupling.

7. The energy transfer method of claim 5, further comprising the step of providing a reflecting means to generate the second beam by reflection of the first beam from the reflecting means.

8. The polarization independent energy exchanger of claim 7, wherein the reflecting means further comprises a back surface air-crystal interface of the photorefractive material.

9. A polarization-independent backscattering phase conjugator for transferring optical energy from a first coherent beam of optical energy having a random polarization orientation to a second coherent beam of optical energy where the second beam is the counterpropagating phase-conjugate reflection of the first beam, comprising:

a nonlinear optical uniaxial crystal having electro-optic coefficients $r_{13}$ and $r_{23}$ of equal magnitude and having a sufficiently large photorefractive charge density to achieve efficient phase-conjugate backscattering, independent of the polarization state of the first beam, the crystal being oriented to receive the first beam therein such that the optic axis of the crystal is aligned parallel to the propagation direction of the first beam and such that the polarization orientation of the first beam is in a random direction within a plane perpendicular to the optic axis of the crystal.

10. The polarization-independent backscattering phase conjugator of claim 9, wherein the crystal has a sufficient photorefractive charge density and a sufficiently large $r_{13}$ electro-optic coefficient that the coupling coefficient at the grating spacing for contradirectional coupling is sufficiently large for contradirectional coupling to predominate in the crystal over codirectional coupling.

11. The polarization-independent backscattering phase conjugator of claim 9, further comprising a means for reflecting, the second beam being seeded by reflection of the first beam from the reflecting means.

12. The polarization-independent backscattering phase conjugator of claim 11, wherein the reflecting means further comprises a retroreflective array.

13. A method for phase-conjugate backscattering optical energy from a first coherent beam of optical energy having a random polarization orientation into a second beam of optical energy where the second beam is a counterpropagating phase-conjugate reflection of the first beam, comprising the steps of:

providing a nonlinear optical uniaxial crystal having electro-optic coefficients $r_{13}$ and $r_{23}$ which are equal and having a sufficiently large photorefractive charge density to achieve efficient phase-conjugate backscattering, independent of the polarization state of the first beam, orienting the crystal to receive the first beam therein such that the optic axis of the crystal is aligned parallel to the propagation direction of the first beam and such that the polarization orientation of the first beam is in a random direction within a plane perpendicular to the optic axis of the crystal.

14. The polarization-independent phase-conjugate backscattering method of claim 13, wherein the crystal is selected to have a sufficient photorefractive charge density and a sufficiently large $r_{13}$ electro-optic coefficient that the coupling coefficient for backscattering phase conjugation at the corresponding grating spacing is sufficiently large for the phase-conjugate contradirectional coupling to predominate over codirectional coupling.

15. The polarization-independent phase-conjugate backscattering method of claim 13, further comprising the step of providing a means for reflecting to seed the second beam by reflection of the first beam from the reflecting means.

16. The polarization-independent phase-conjugate backscattering of claim 15, wherein the reflecting means further comprises a retroreflective array.

* * * * *